US008122293B2

(12) United States Patent
Lee et al.

(10) Patent No.: US 8,122,293 B2
(45) Date of Patent: Feb. 21, 2012

(54) METHOD FOR AUTOMATICALLY SIMULATING MANUAL TESTING OF A COMPUTER, AND TESTING SYSTEM FOR PERFORMING THE METHOD

(75) Inventors: Yuan-Chan Lee, Hsichih (TW); Chan-Mei Chu, Hsichih (TW)

(73) Assignee: Winstron Corporation, Taipei Hsien (TW)

( * ) Notice: Subject to any disclaimer, the term of this patent is extended or adjusted under 35 U.S.C. 154(b) by 220 days.

(21) Appl. No.: 12/332,293

(22) Filed: Dec. 10, 2008

(65) Prior Publication Data
US 2009/0306954 A1   Dec. 10, 2009

(30) Foreign Application Priority Data
Jun. 5, 2008   (TW) ................................. 97120925 A (51) Int. Cl.
*G06F 11/00* (2006.01)
*G06F 11/22* (2006.01)
(52) U.S. Cl. ................. 714/36; 714/25; 714/32
(58) Field of Classification Search .................... 714/36, 714/25, 32
See application file for complete search history.

(56) References Cited

U.S. PATENT DOCUMENTS

| 5,574,855 | A | * | 11/1996 | Rosich et al. | 714/41 |
| 6,002,869 | A | * | 12/1999 | Hinckley | 717/124 |
| 6,338,148 | B1 | * | 1/2002 | Gillenwater et al. | 714/25 |
| 6,421,792 | B1 | * | 7/2002 | Cromer et al. | 714/36 |
| 6,581,169 | B1 | * | 6/2003 | Chen et al. | 714/47 |
| 6,591,376 | B1 | * | 7/2003 | VanRooven et al. | 714/36 |
| 7,058,857 | B2 | * | 6/2006 | Dallin | 714/38.14 |
| 7,103,641 | B2 | * | 9/2006 | Brannock | 709/217 |
| 7,428,663 | B2 | * | 9/2008 | Morton et al. | 714/36 |
| 7,552,424 | B1 | * | 6/2009 | Bischof et al. | 717/127 |
| 7,574,624 | B2 | * | 8/2009 | Chen et al. | 714/36 |

FOREIGN PATENT DOCUMENTS

| CN | 1889051 A | 1/2007 |
| TW | 1257042 B | 6/2006 |
| TW | 1291614 B | 12/2007 |

OTHER PUBLICATIONS

Office Action dated Jul. 13, 2011, issued in corresponding Chinese Application No. 200810125104.X, with abridged English translation provided by Taiwanese foreign associate, 14 pages.
Office Action dated Sep. 22, 2011, issued in corresponding Taiwanese Application No. 97120925, with abridged English translation provided by Taiwanese foreign associate, 6 pages.

* cited by examiner

*Primary Examiner* — Joseph Schell
(74) *Attorney, Agent, or Firm* — Christensen O'Connor Johnson Kindness PLLC (57) ABSTRACT

A method for automatically simulating manual testing of a computer after the computer is powered on includes the steps of: (a) connecting the computer to an external storage device having a script recorded thereon that corresponds to a manual testing operation; and (b) after the computer is powered on, enabling the computer to access the script of the external storage device for performing the manual testing operation. By providing automatic simulation of manual testing of a computer after the computer is powered on, time and labor costs incurred in a conventional method of manually inputting instructions required for the manual testing operation in the computer are saved.

11 Claims, 5 Drawing Sheets

METHOD FOR AUTOMATICALLY SIMULATING MANUAL TESTING OF A COMPUTER, AND TESTING SYSTEM FOR PERFORMING THE METHOD

CROSS-REFERENCE TO RELATED APPLICATION

This application claims priority of Taiwanese application no. 097120925, filed on Jun. 5, 2008.

BACKGROUND OF THE INVENTION

1. Field of the Invention

This invention relates to a self-testing method for a computer and a device used for performing the method, more particularly to a method for automatically simulating manual testing of a computer after the computer is powered on, a testing system, and an external storage device used for performing the method.

2. Description of the Related Art

Before a new computer leaves the factory, there is often a need to perform a series of hardware, software, and/or firmware tests in order to ensure quality. Firmware testing, in particular, frequently calls for a manual testing operation in which instructions must be manually input in each computer. Clearly, the manual testing operation is time consuming and impedes efficient computer production. Moreover, it is difficult to ascertain completeness of the manual testing operation. The aforesaid drawbacks of the manual testing operation also impact computer repair. If, for example, firmware in a number of computers has a similar problem, the manual testing operation impedes rapid testing and repair. In addition, conventional WISE or ICE testing devices, commonly used for testing individual computers in a laboratory setting, are costly, and are moreover incapable of performing testing on a large volume of computers.

The aforesaid drawbacks have not been adequately addressed by current computer testing technologies. For example, in Taiwanese Patent Application No. 93139762, use of a computer to detect automatically an error of a peripheral device connected thereto is disclosed, yet the aforesaid application is not suitable for automatic testing of components inside the computer. In contrast, Taiwanese Patent Application No. 94135316 discloses a method for determining an address of a program module in which an error has occurred when a computer crashes. In sum, the abovementioned patent applications do not provide a way of automating the manual testing operation.

SUMMARY OF THE INVENTION

Therefore, the object of the present invention is to provide a method for automatically simulating manual testing of a computer after the computer is powered on, a testing system, and an external storage device that save time and labor costs.

According to the present invention, there is provided a method for automatically simulating manual testing of a computer after the computer is powered on. The method for automatically simulating manual testing of a computer after the computer is powered on comprises the steps of:

(a) connecting the computer to an external storage device having a script recorded thereon that corresponds to a manual testing operation; and (b) after the computer is powered on, enabling the computer to access the script of the external storage device for performing the manual testing operation.

In an embodiment of the invention, step (b) further includes the sub-step of:

(b-1) when the computer is in a power on self-test stage, enabling the computer to determine whether the script has a conforming checkpoint code, and if it is determined that the script has the conforming checkpoint code, enabling the computer to perform a test procedure corresponding to the checkpoint code and to store a test result.

In an embodiment of the invention, step (b) further includes the sub-step of:

(b-2) when the computer is in a runtime stage, and after at least one event has been run, enabling the computer to determine whether the script has a conforming event code, and if it is determined that the script has the conforming event code, enabling the computer to perform a test procedure corresponding to the event code and to store a test result.

According to another aspect of the present invention, there is provided an external storage device for enabling a computer to automatically simulate manual testing after the computer is powered on. The external storage device comprises a script recorded thereon that corresponds to a manual testing operation. The script is provided to the computer for performing the manual testing operation after the external storage device is initialized by the computer. The script is provided with a plurality of batch procedures. Each of the batch procedures is used to simulate instructions necessary for performing the manual testing operation.

In an embodiment of the invention, the script includes a power on self-test checkpoint processing table. The power on self-test checkpoint processing table is provided with a power on self-test checkpoint processing header, a checkpoint code, an action type, a test parameter and a test result.

In an embodiment of the invention, the script includes a runtime event processing table. The runtime event processing table is provided with a runtime event processing header, an event code, an action type, a test parameter and a test result.

According to yet another aspect of the present invention, there is provided a testing system for automatically simulating manual testing of a computer after the computer is powered on. The testing system for automatically simulating manual testing of a computer after the computer is powered on comprises an external storage device and a computer-under-test. The external storage device has a script recorded thereon that corresponds to a manual testing operation. The computer-under-test is connected to the external storage device. The computer-under-test accesses the script of the external storage device for performing the manual testing operation after the computer-under-test is powered on.

Since the conventional method of manually inputting instructions necessary for performing the manual testing operation in each computer is time consuming, the method for automatically simulating manual testing of a computer after the computer is powered on of the present invention is proposed as a substitute capable of saving time and labor costs.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
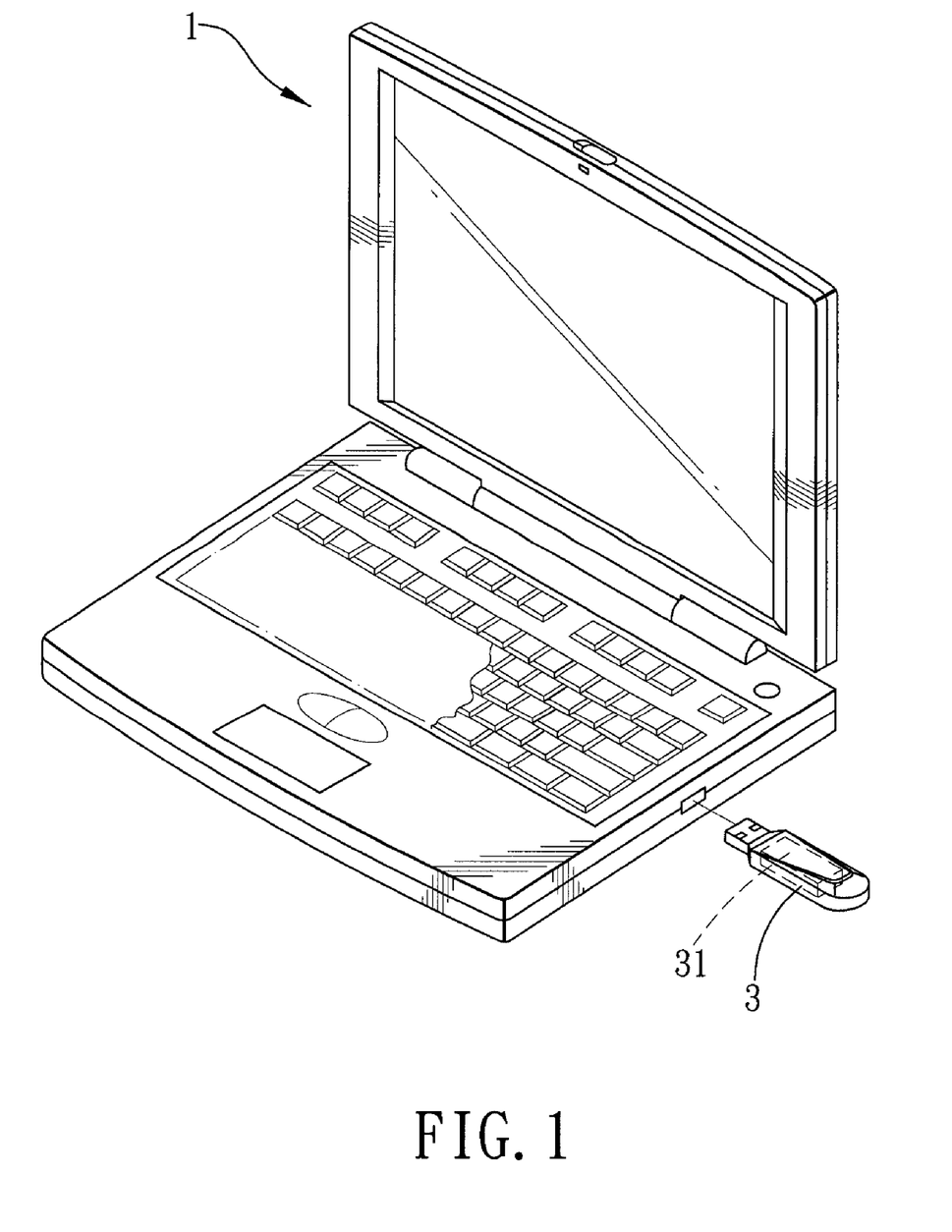
FIG. 1 is a schematic diagram of a preferred embodiment of a testing system for automatically simulating manual testing of a computer after the computer is powered on according to the present invention.
Figure 2:
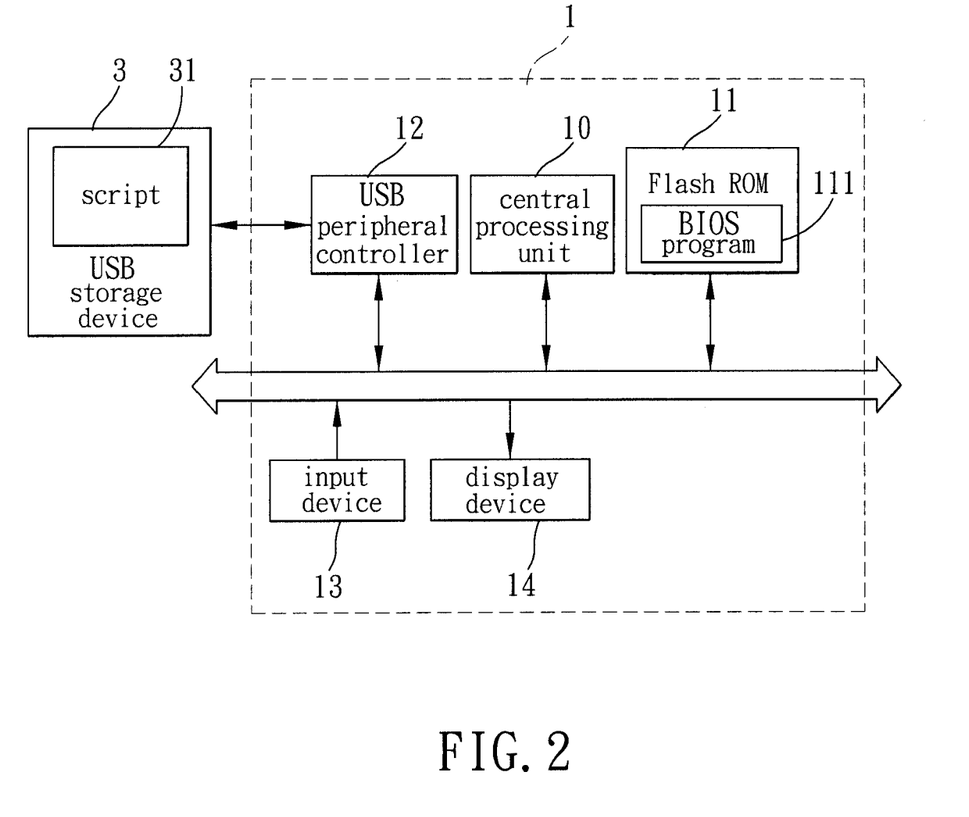
FIG. 2 is a schematic circuit block diagram to illustrate components of the preferred embodiment.

FIGS. 1 and 2 illustrate a preferred embodiment of a testing system for automatically simulating manual testing of a computer after the computer is powered on according to the present invention. The testing system includes a USB storage device 3 and a computer-under-test 1. The testing system is suitable for testing a newly manufactured computer or a computer in need of repair.

The USB storage device 3 includes a script 31 recorded thereon that corresponds to a manual testing operation. In this embodiment, the USB storage device 3 is provided with a plurality of batch procedures. Each of the batch procedures is used to simulate instructions necessary for performing the manual testing operation.

The computer 1 is connected to the USB storage device 3 for accessing the script 31 and performing the manual testing operation after the computer 1 is powered on. In this embodiment, the computer 1 is provided with a central processing unit 10, a Flash ROM 11 loaded with a basic input/output system (BIOS) program 111, a USB peripheral controller 12, an input device 13 and a display device 14. The USB peripheral controller 12 is for connecting to the USB storage device 3.

Figure 3:
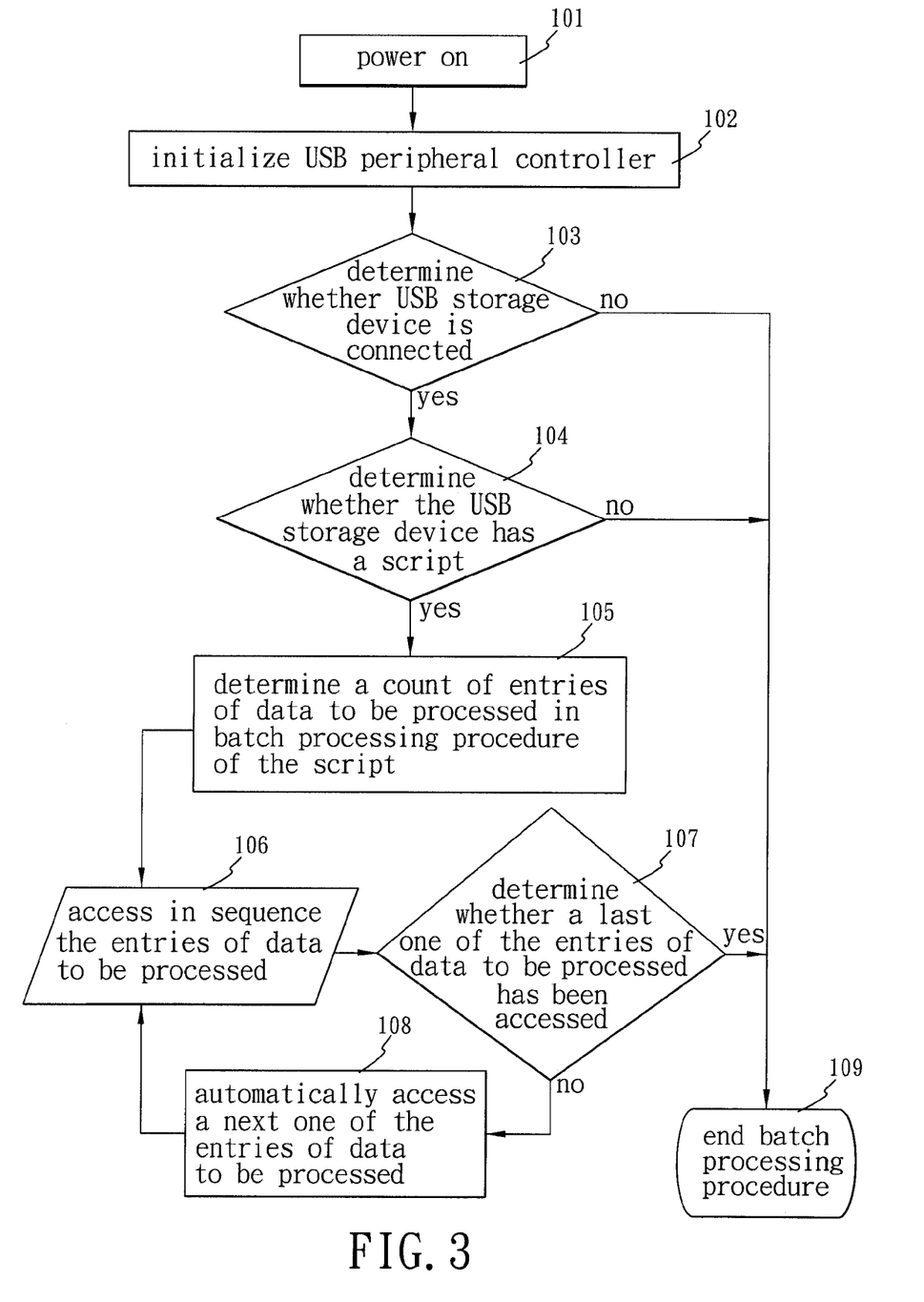
FIG. 3 is a flow chart of a preferred embodiment of a method for automatically simulating manual testing of a computer after the computer is powered on according to the present invention.

Referring to FIG. 3, the preferred embodiment of a method for automatically simulating testing of a computer after the computer is powered on according to the present invention, as performed by the testing system, is shown to comprise the following steps:

In step 101, the computer 1 is powered on.

In step 102, the computer 1 initializes the USB peripheral controller 12.

In step 103, the computer 1 determines whether the USB storage device 3 is connected. If it is determined that the USB storage device 3 is connected, the flow proceeds to step 104. Otherwise, the flow proceeds to step 109, wherein a batch processing procedure is ended.

In step 104, the computer 1 determines whether the USB storage device 3 has the script 31. If it is determined that the USB storage device 3 has the script 31, the flow proceeds to step 105. Otherwise, the flow proceeds to step 109, wherein the batch processing procedure is ended.

In step 105, the computer 1 determines a count of entries of data to be processed in the batch processing procedure of the script 31. The flow then proceeds to step 106.

In step 106, the computer 1 accesses the entries of data to be processed in sequence. The flow then proceeds to step 107.

In step 107, the computer 1 determines whether a last one of the entries of data to be processed has been accessed. If it is determined that the last one of the entries of data to be processed has been accessed, the flow proceeds to step 109, wherein the batch processing procedure is ended. Otherwise, the flow proceeds to step 108.

In step 108, the computer 1 proceeds to access a next one of the entries of data to be processed. The flow then returns to step 106.

Figure 4:
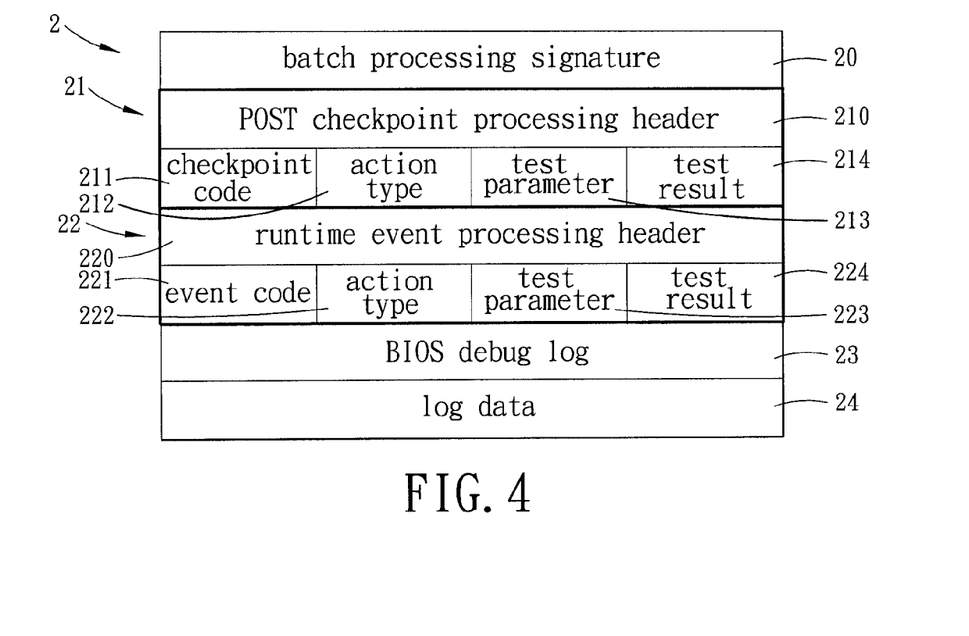
FIG. 4 is a schematic diagram to illustrate format of a script of the preferred embodiment.

Referring to FIG. 4, in this embodiment, the script 31 (see FIG. 2) is USB header data 2. The format of the USB header data 2 includes a batch processing signature 20, a power on self-test checkpoint processing table 21, a runtime event processing table 22, a BIOS debug log 23, and log data 24.

In this embodiment, the manual testing operation to be automatically simulated can be roughly divided into two phases: a power on self-test checkpoint processing phase and a runtime event processing phase. The power on self-test checkpoint processing phase refers to a period in which the computer 1 accesses the power on self-test checkpoint processing table 21 for performing sequentially test procedures corresponding to distinct codes of the power on self-test checkpoint processing table 21. The runtime event processing phase refers to a period subsequent to the power on self-test checkpoint processing phase, in which the computer 1 accesses the runtime event processing table 22 for performing test procedures corresponding to distinct codes of the runtime event processing table 22.

It is noted that the BIOS program 111 is capable of accessing and analyzing the power on self-test checkpoint processing table 21 and the runtime event processing table 22 of the script 31, and that portions of the method of the present invention can be performed by a routine of the BIOS program 111.

In this embodiment, the power on self-test checkpoint processing table 21 is provided with a power on self-test checkpoint processing header 210, a checkpoint code 211, an action type 212, a test parameter 213 and a test result 214. The power on self-test checkpoint processing header 210 is provided with a power on self-test batch processing signature and a checksum. The power on self-test batch processing signature indicates a power on self-test batch processing procedure to be performed. The checksum indicates a count of entries of data to be processed in the power on self-test batch processing procedure. Referring to exemplary content of the power on self-test checkpoint processing table 21 shown in FIG. 5, the POST batch processing signature is W!POSTCK, and the checksum is 00000002, indicating that there are two entries of data to be processed in the power on self-test batch processing procedure. The checkpoint code 211 is a code indicating a test procedure to be performed on a hardware component of the computer 1.

Similarly, the runtime event processing table 22 is provided with a runtime event processing header 220, an event code 221, an action type 222, a test parameter 223 and a test result 224. The runtime event processing header 220 is provided with a runtime batch processing signature and a checksum. The runtime batch processing signature indicates a runtime batch processing procedure to be performed, and the checksum indicates a count of entries of data to be processed in the runtime batch processing procedure. Referring to exemplary content of the runtime event processing table 22 shown in FIG. 5, the runtime batch processing signature is W!RunTTB, and the checksum is 00000001, indicating that there is one entry of data to be processed in the runtime batch processing procedure. The event code 221 is a code indicating a test procedure to be performed on a predetermined event of the computer 1.

What is referred to herein as 'runtime' can be an entry into Windows, DOS, or any phase of operation that a particular operating system defines as runtime. What is referred to herein as an 'event' is an event which, under a particular operating system environment, is related to hardware operation. Examples of an event include a central processing unit speed and a keyboard input. An 'event' can also be that which is categorized as such according to ACPI SPEC specifications.

Figure 5:
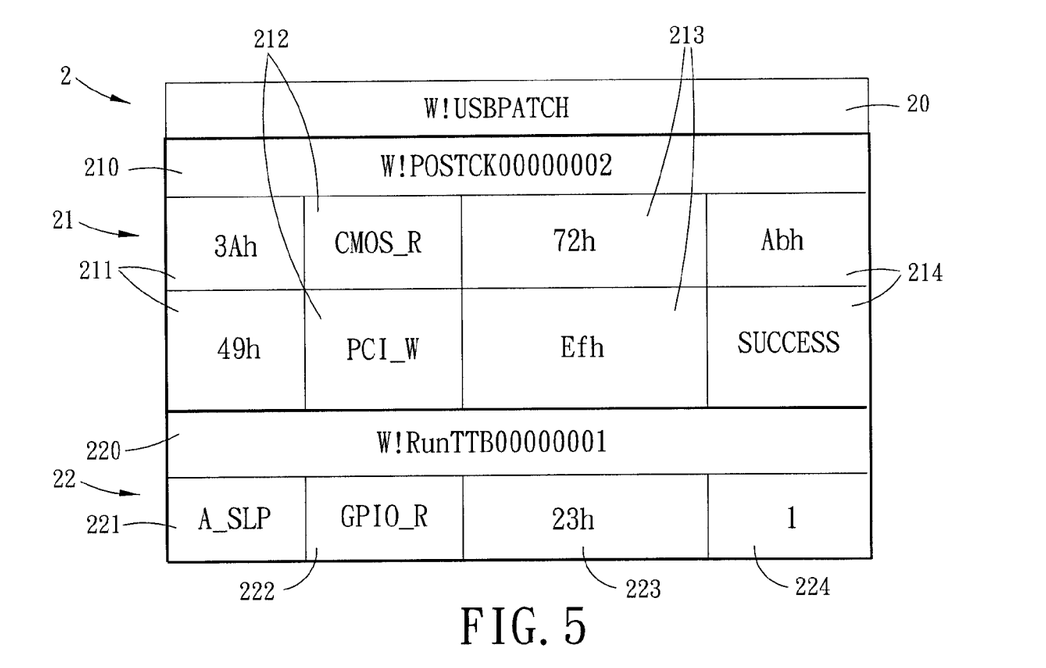
FIG. 5 is a schematic diagram to illustrate exemplary content of the script of the preferred embodiment.

Referring again to FIG. 5, the exemplary content of the power on self-test checkpoint processing table 21 includes entries for test procedures performed on CMOS and PCI bus register hardware components, and is interpreted as follows:

The checkpoint code 211 corresponding to the test procedure performed on the CMOS is '3Ah'; the action type 212 of 'CMOS_R' indicates a read operation; the test parameter 213 of '72h' specifies the address accessed for the read operation; and the test result 214 of 'Abh' is a value accessed through the read operation.

The checkpoint code 211 corresponding to the test procedure performed on the PCI bus register is '49h'; the action type 212 of 'PCI_W' indicates a write operation; the test parameter 213 of 'Efh' specifies the address accessed for the write operation; and the test result 214 of 'success' indicates successful completion of the write operation.

The exemplary content of the runtime event processing table 22 includes an entry for a test procedure for accessing a GPIO value, and is interpreted as follows: The event code 221 corresponding to the test procedure is 'A_SLP'; the action type 222 of 'GPIO_R' specifies a read operation; the test parameter 223 of '23h' specifies an address accessed for the read operation; and the test result 224 of '1' is a value accessed through the read operation.

Figure 6:
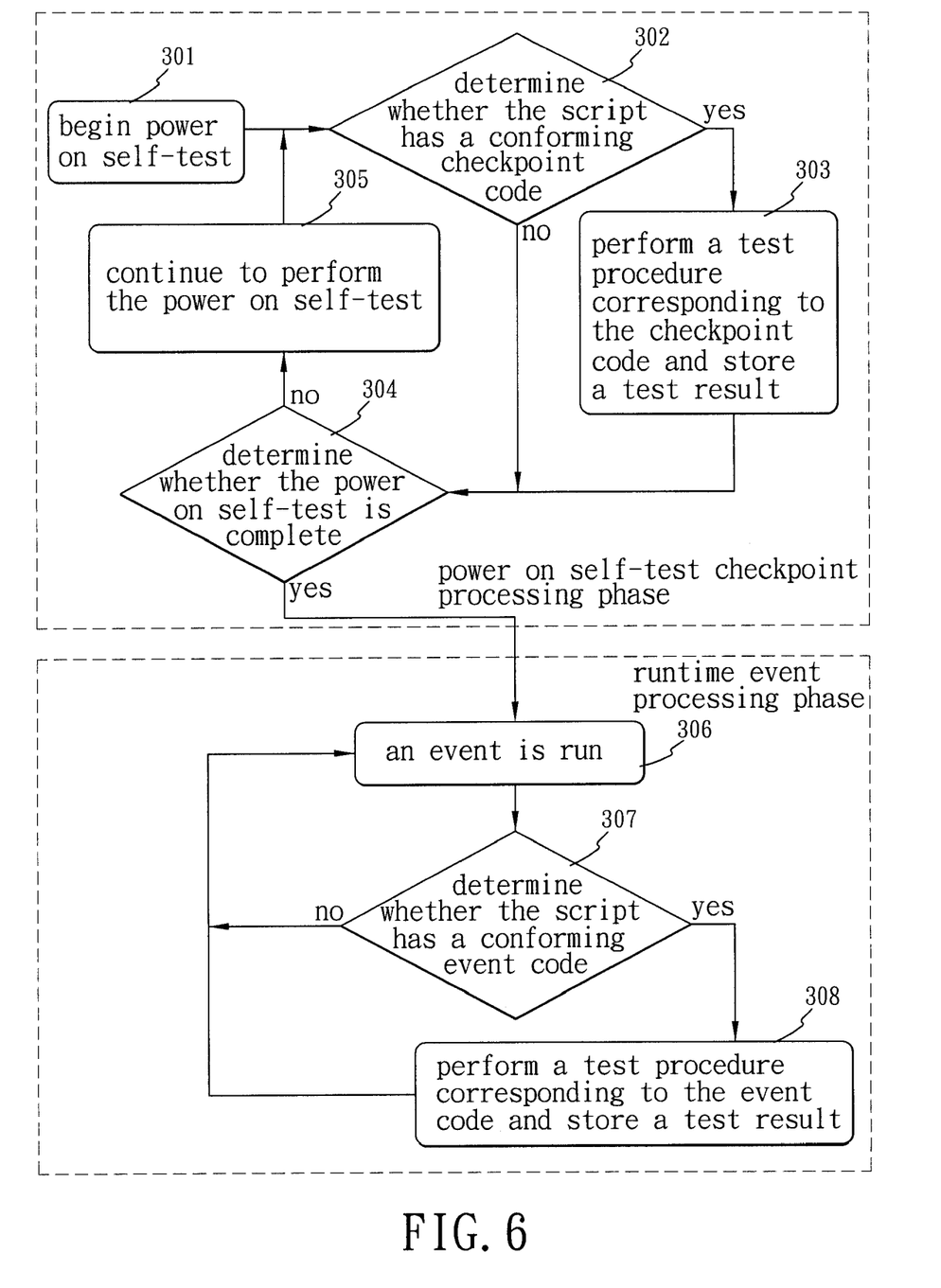
FIG. 6 is a flow chart to illustrate a power on self-test checkpoint processing phase and a runtime event processing phase of the method of the preferred embodiment.

Referring to FIG. 6, and comparing FIG. 6 to FIG. 3, the power on self-test checkpoint processing phase and the runtime event processing phase of the method of the preferred embodiment are shown to comprise the following steps:

In step 301, the computer 1 begins a power on self-test. In the process of performing the power on self-test, that is, in the power on self-test stage, the computer 1 initializes the USB storage device 3 and accesses the script 31.

In step 302, the computer 1 determines whether the script 31 has a conforming checkpoint code. If it is determined that the script 31 has the conforming checkpoint code, the flow proceeds to step 303. Otherwise, the flow proceeds to step 304.

In step 303, the computer 1 performs a test procedure corresponding to the checkpoint code and stores a test result. The flow then proceeds to step 304.

In step 304, the computer 1 determines whether the power on self-test is complete. If it is determined that the power on self-test is complete, the computer 1 enters a runtime stage. Otherwise, the flow proceeds to step 305.

In step 305, the computer 1 continues performing the power on self-test, and subsequently, the flow returns to step 302.

In step 306, the computer 1 is in the runtime stage, and an event is run. The flow then proceeds to step 307.

In step 307, it is determined whether the script 31 has a conforming event code. If it is determined that the script 31 has the conforming event code, the flow proceeds to step 308. Otherwise, the flow returns to step 306.

In step 308, the computer 1 performs a test procedure corresponding to the event code and stores a test result. The flow then returns to step 306.

In sum, the method for automatically simulating manual testing of a computer after the computer is powered on according to the present invention, when performed on a newly manufactured computer or a computer under repair, is capable of automatically simulating the manual testing operation for an individual computer. The method of the present invention saves time, and thus promotes efficient computer production and repair. In addition, the USB storage device 3 can substitute for costly WISE or ICE testing devices, and can be repeatedly used for testing large volumes of computers.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An external storage device for enabling a computer to automatically simulate manual testing after the computer is powered on, said external storage device comprising a script recorded thereon that corresponds to a manual testing operation, said script being provided to the computer for performing the manual testing operation after said external storage device is initialized by the computer;

wherein said script includes a power on self-test checkpoint processing table, said power on self-test checkpoint processing table being provided with a power on self-test checkpoint processing header, a checkpoint code, an action type, a test parameter and a test result; and wherein said power on self-test checkpoint processing header is provided with a power on self-test batch processing signature and a checksum, said power on self-test batch processing signature indicating a power on self-test batch processing procedure to be performed, said checksum indicating a count of entries of data to be processed in said power on self-test batch processing procedure.

2. An external storage device for enabling a computer to automatically simulate manual testing after the computer is powered on, said external storage device comprising a script recorded thereon that corresponds to a manual testing operation, said script being provided to the computer for performing the manual testing operation after said external storage device is initialized by the computer;

wherein said script includes a power on self-test checkpoint processing table, said power on self-test checkpoint processing table being provided with a power on self-test checkpoint processing header, a checkpoint code, an action type, a test parameter and a test result; and wherein said script includes a runtime event processing table, said runtime event processing table being provided with a runtime event processing header, an event code, an action type, a test parameter and a test result.

3. The external storage device for enabling a computer to automatically simulate manual testing after the computer is powered on as claimed in claim 2, wherein said runtime event processing header is provided with a runtime batch processing signature and a checksum, said runtime batch processing signature indicating a runtime batch processing procedure to be performed, said checksum indicating a count of entries of data to be processed in said runtime batch processing procedure.

4. A testing system for automatically simulating manual testing of a computer after the computer is powered on, comprising:

an external storage device having a script recorded thereon that corresponds to a manual testing operation; and a computer-under-test connected to said external storage device, said computer-under-test accessing said script of said external storage device for performing the manual testing operation after said computer-under-test is powered on;

wherein, when said computer-under-test performs a power on self-test, said computer-under-test initializes said external storage device and accesses said script for determining whether said script has a conforming checkpoint code for performing testing on a hardware element, and if a conforming checkpoint code is found, said computer-under-test performs a test procedure corresponding to said checkpoint code and stores a test result, and if no conforming checkpoint code is found, said computer-under-test continues the power on self-test; and wherein, after said computer-under-test is powered on, said computer-under-test determines a count of entries of data to be processed in a batch processing procedure of said script; when the count has been determined, said computer-under-test accesses said entries of data to be processed in sequence; and said computer-under-test completes said batch processing procedure when said computer-under-test has determined that a last one of said entries of data to be processed has been accessed.

5. A testing system for automatically simulating manual testing of a computer after the computer is powered on, comprising:

an external storage device having a script recorded thereon that corresponds to a manual testing operation; and a computer-under-test connected to said external storage device, said computer-under-test accessing said script of said external storage device for performing the manual testing operation after said computer-under-test is powered on;

wherein, when said computer-under-test performs a power on self-test, said computer-under-test initializes said external storage device and accesses said script for determining whether said script has a conforming checkpoint code for performing testing on a hardware element, and if a conforming checkpoint code is found, said computer-under-test performs a test procedure corresponding to said checkpoint code and stores a test result, and if no conforming checkpoint code is found, said computer-under-test continues the power on self-test;

wherein said script includes a power on self-test checkpoint processing table that is provided with said checkpoint code, a power on self-test checkpoint processing header, an action type, a test parameter and a test result; and wherein said power on self-test checkpoint processing header is provided with a power on self-test batch processing signature and a checksum, said power on self-test batch processing signature indicating a power on self-test batch processing procedure to be performed, said checksum indicating a count of entries of data to be processed in said power on self-test batch processing procedure.

6. A testing system for automatically simulating manual testing of a computer after the computer is powered on, comprising:

an external storage device having a script recorded thereon that corresponds to a manual testing operation; and a computer-under-test connected to said external storage device, said computer-under-test accessing said script of said external storage device for performing the manual testing operation after said computer-under-test is powered on;

wherein said computer-under-test first enters a power on self-test stage, and when the power on self-test stage is complete, said computer-under-test enters a runtime stage during which events are run, and in the runtime stage, after each of the events is run, said computer-under-test determines whether said script has a conforming event code for performing testing on a predetermined event, and if said computer-under-test determines that there is said conforming event code, said computer-under-test performs a test procedure corresponding to said event code and stores a test result, and if no conforming event code is found, said computer-under-test continues running each event; and wherein said script includes a runtime event processing table that is provided with said event code, a runtime event processing header, an action type, a test parameter, and a test result.

7. The testing system for automatically simulating manual testing of a computer after the computer is powered on as claimed in claim 6, wherein said runtime event processing header is provided with a runtime batch processing signature and a checksum, said runtime batch processing signature indicating a runtime batch processing procedure to be performed, said checksum indicating a count of entries of data to be processed in said runtime batch processing procedure.

8. An external storage device for enabling a computer to automatically simulate manual testing after the computer is powered on, said external storage device comprising a script recorded thereon that corresponds to a manual testing operation, said script being provided to the computer for performing the manual testing operation after said external storage device is initialized by the computer;

wherein said script includes a power on self-test checkpoint processing table, said power on self-test checkpoint processing table being provided with a power on self-test checkpoint processing header, a checkpoint code, an action type, a test parameter and a test result, said self-test checkpoint processing header indicating a power on self-test batch processing procedure to be performed and a count of entries of data to be processed in said power on self-test batch processing procedure.

9. An external storage device for enabling a computer to automatically simulate manual testing after the computer is powered on, said external storage device comprising a script recorded thereon that corresponds to a manual testing operation, said script being provided to the computer for performing the manual testing operation after said external storage device is initialized by the computer;

wherein said script includes a power on self-test checkpoint processing table, said power on self-test checkpoint processing table being provided with a power on self-test checkpoint processing header, a checkpoint code, an action type, a test parameter and a test result; and wherein said script includes a runtime event processing table provided with a test parameter and a test result.

10. A testing system for automatically simulating manual testing of a computer after the computer is powered on, comprising:

an external storage device having a script recorded thereon that corresponds to a manual testing operation; and a computer-under-test connected to said external storage device, said computer-under-test accessing said script of said external storage device for performing the manual testing operation after said computer-under-test is powered on;

wherein, when said computer-under-test performs a power on self-test, said computer-under-test initializes said external storage device and accesses said script for determining whether said script has a conforming checkpoint code for performing testing on a hardware element, and if a conforming checkpoint code is found, said computer-under-test performs a test procedure corresponding to said checkpoint code and stores a test result, and if no conforming checkpoint code is found, said computer-under-test continues the power on self-test; and wherein said computer-under-test determines a count of entries of data to be processed in a batch processing procedure of said script, and when the count has been determined, said computer-under-test accesses said entries of data to be processed in sequence.

11. A testing system for automatically simulating manual testing of a computer after the computer is powered on, comprising:

an external storage device having a script recorded thereon that corresponds to a manual testing operation; and a computer-under-test connected to said external storage device, said computer-under-test accessing said script of said external storage device for performing the manual testing operation after said computer-under-test is powered on;

wherein, when said computer-under-test performs a power on self-test, said computer-under-test initializes said external storage device and accesses said script for determining whether said script has a conforming checkpoint code for performing testing on a hardware element, and if a conforming checkpoint code is found, said computer-under-test performs a test procedure corresponding to said checkpoint code and stores a test result, and if no conforming checkpoint code is found, said computer-under-test continues the power on self-test; and wherein said script includes a power on self-test checkpoint processing header indicating a count of entries of data to be processed in said power on self-test batch processing procedure.

* * * * *